United States Patent
Lu et al.

(10) Patent No.: US 10,040,275 B2
(45) Date of Patent: Aug. 7, 2018

(54) PRINTING METHOD FOR 3D PRINTER

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventors: Ting-Yu Lu, New Taipei (TW); Hsien-Chung Chen, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 286 days.

(21) Appl. No.: 14/809,850

(22) Filed: Jul. 27, 2015

(65) Prior Publication Data

US 2016/0325502 A1 Nov. 10, 2016

(30) Foreign Application Priority Data

May 6, 2015 (CN) .......................... 2015 1 0224771

(51) Int. Cl.
*B33Y 10/00* (2015.01)
*B29C 67/00* (2017.01)

(52) U.S. Cl.
CPC .......... *B33Y 10/00* (2014.12); *B29C 67/0059* (2013.01)

(58) Field of Classification Search
None
See application file for complete search history.

(56) References Cited

U.S. PATENT DOCUMENTS

| | | | |
|---|---|---|---|
| 6,259,962 B1 * | 7/2001 | Gothait | B29C 41/36 700/118 |
| 7,589,868 B2 * | 9/2009 | Velde | B29C 67/0092 358/1.9 |

\* cited by examiner

*Primary Examiner* — Matthew J Daniels
*Assistant Examiner* — Mohammad M Ameen
(74) *Attorney, Agent, or Firm* — Chun-Ming Shih; HDLS IPR Services

(57) ABSTRACT

A printing method for a 3D printer is present. After opening a 3D model, the method divides the 3D model into several area objects which are separately corresponding to different areas of the 3D model being formed on a forming platform of the printer. When executing printing procedures, the method firstly determines a lowest area object of the several unfinished area objects. Then, a nozzle array of the 3D printer is controlled to move to upon an area according to the determined area object, and to jet ink upon the area for stacking the determined area object. After the determined area object is stacked completely, the nozzle array is then controlled to move to other area and stack other area object.

8 Claims, 14 Drawing Sheets

PRINTING METHOD FOR 3D PRINTER

BACKGROUND OF THE INVENTION

1. Technical Field

The technical field relates to a 3D printer, and specifically to a printing method of the 3D printer.

2. Description of Prior Art 3D printing technology can produce a real 3D model by way of jetting ink and solidifying the jetted ink based on user-inputted 3D image files, which is very convenient. Moreover, as the maturity of 3D printing technology, the price of 3D printer is getting cheaper recently. As such, 3D printing technology popularizes around people these years.

Refers to FIG. 1, which is a schematic diagram of 3D printer according to related art. Particularly, ink-jet type 3D printer 1 (refers to as the 3D printer 1) comprises a nozzle array 2 and a forming platform 3. The nozzle array 2 comprises several nozzles 21 (generally comprising six to eight nozzles). The nozzle array 2 is generally arranged on a track 10 at an internal top face of the 3D printer 1, and can be controlled to move forward, backward, left and right. Moreover, the nozzle array 2 in some specific types of 3D printer 1 can further move up and down.

The forming platform 3 is arranged upward from a supporting pillar (not shown) at a bottom face of the 3D printer 1 and located below the nozzle array 2, and in particularly, the forming platform 3 is controlled to rise or descend for adjusting a distance between the forming platform 3 and the nozzle array 2. When stacking a 3D model 4, the nozzle array 2 is controlled to jet ink to a plane of the forming platform 3, and the 3D printer 1 emits light thereon through a lighting source (not shown), so as to solidify the jetted ink upon the forming platform 3.

Generally speaking, the distance between a forming-surface and the nozzle array 2 is fixed, and an ink splattering situation can be avoided by fixing the distance. In particularly, before the 3D printer 1 producing the 3D model 4, a surface of the forming platform 3 is regarded as the above mentioned forming-surface. When the nozzle array 2 starts to jet ink at the forming platform 3, and the jetted ink is solidified to as a first layer of the 3D model 4, a surface 40 of the first layer is then regarded as the forming-surface. At the time, the forming platform 3 is controlled to descend, so as to keep the distance between the nozzle array 2 and the forming-surface.

Then, the nozzle array 2 is controlled to jet ink at the surface 40 of the first layer, so as to stack a second layer on the first layer, and the surface 40 of the second layer is then regarded as the forming-surface, and so on. Finally, the 3D model 4 is constituted by a plurality of layers.

In the related art, the 3D printer 1 uses the whole 3D model 4 as a printing fundation, and controls the nozzle array 2 to move there and back along the track 10, for stacking the first layer, the second layer, etc. in order. If a 3D model is constituted by 1000 layers, the nozzle array 2 needs to work cooperating with the descending action of the forming platform 3, so as to stack the 1000 layers in order. The above description shows that the nozzle array 2 needs to be controlled to move many times for printing a whole 3D model.

For example, if the 3D model 4 is constituted by 1000 layers, and the nozzle array 2 needs to move 5 times back-and-forth for stacking 1 layer completely, then, in this example, the nozzle array 2 needs to move there and back 5000 times for finishing the 3D model 4.

The nozzle array of current 3D printer is usually driven by a motor of the 3D printer, so the time spent for printing a 3D model in the related art is too long. Besides, the damage of the motor or the nozzle array will be more probably if the moving frequency of the nozzle array is too often.

SUMMARY OF THE INVENTION

The disclosure is directed to a printing method of a 3D printer, which can vertically divide a 3D model into a plurality of area objects, and prints the plurality of area objects in order for constructing the 3D model completely, therefore, the disclosure can solve the problem that a nozzle array of a traditional 3D printer needs to move there and back continually while printing the 3D model, the printing time spent by the 3D printer is too long, and the nozzle array of the 3D printer is easily damaged.

In one of the exemplary embodiments, the printing method divides a 3D model into several area objects which are separately according to different areas of the 3D model being formed on a forming platform of the printer after opening the 3D model. When executing printing procedures, the method firstly determines a lowest area object of the several unfinished area objects. Then, a nozzle array of the 3D printer is controlled to move to upon an area according to the determined area object, and to jet ink upon the area for stacking the determined area object. After the determined area object is stacked completely, the nozzle array is then controlled to move to other area and stack other area object. In the embodiment, the printing method controls the 3D printer to repeat the above printing procedures continually, until all area objects of the 3D model are finished stacking.

In the embodiment of the invention, the nozzle array is fixed upon a corresponding area when printing one of the plurality of area objects. After one of the plurality of area objects is finished stacking or stacked to a threshold height, the nozzle array can then be controlled to move and fix upon other area corresponding to other area object for stacking the other area object thereupon.

As mentioned above, the embodiment of the present invention is to print the 3D model based on each of the plurality of area objects, but not to stack the 3D model layer-by-layer based on the whole 3D model. Comparing with related art, the invention efficaciously reduces the moving frequency of the nozzle array while executing the printing procedures, and can further reduce the time spent for the printing procedures. Also, it can solve the nozzle array of the 3D printer from being damaged because of the high moving frequency while printing the 3D model.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
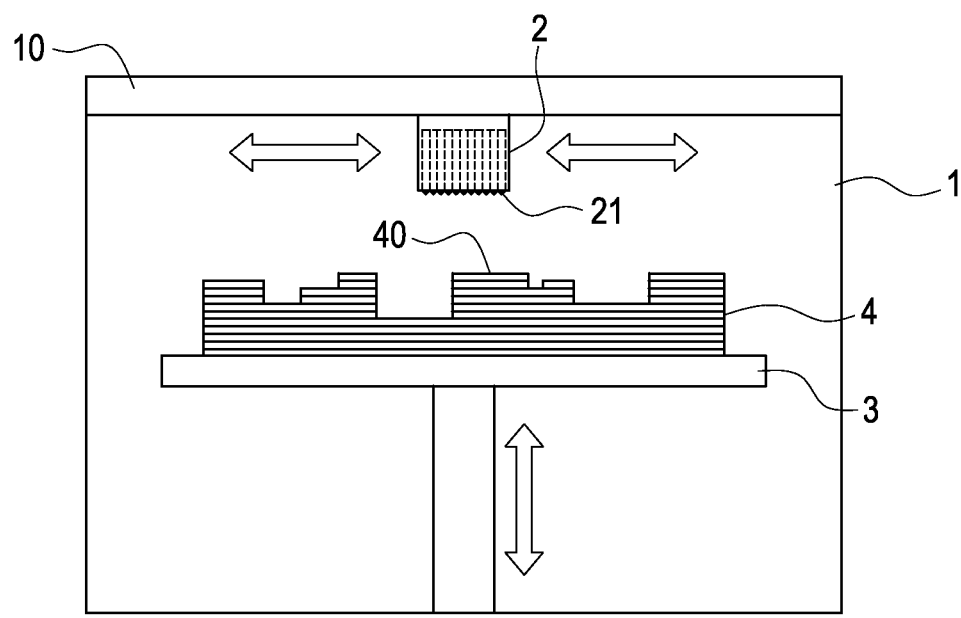
FIG. 1 is a schematic diagram of 3D printer according to related art.

In one embodiment of this invention discloses a printing method, which is applied in a 3D printer 1 comprising a nozzle array 2 and a forming platform 3 as shown in FIG. 1. The nozzle array 2 comprises a plurality of nozzles, which are arranged on a track 10 at an internal top face of the 3D printer 1, and can be controlled to move (forward, backward, left, right, up and down) upon the track 10. The forming platform 3 is arranged upward from a bottom face of the 3D printer 1 and located below the nozzle array 2. When producing a 3D model, the 3D printer 1 jets ink at a top face of the forming platform 3 via the nozzle array 2, and emits light thereon through a lighting source (not shown), so as to solidify the jetted ink upon the forming platform 3.

In particularly, the 3D printer 1 applied in the present invention is similar to that of the related art. However, through software controlling, the present invention provides other printing method different from that of the related art which moves the nozzle array 2 there and back continually based on the whole 3D model for printing the 3D model layer-by-layer. The detailed description is disclosed as the following.

Figure 2:
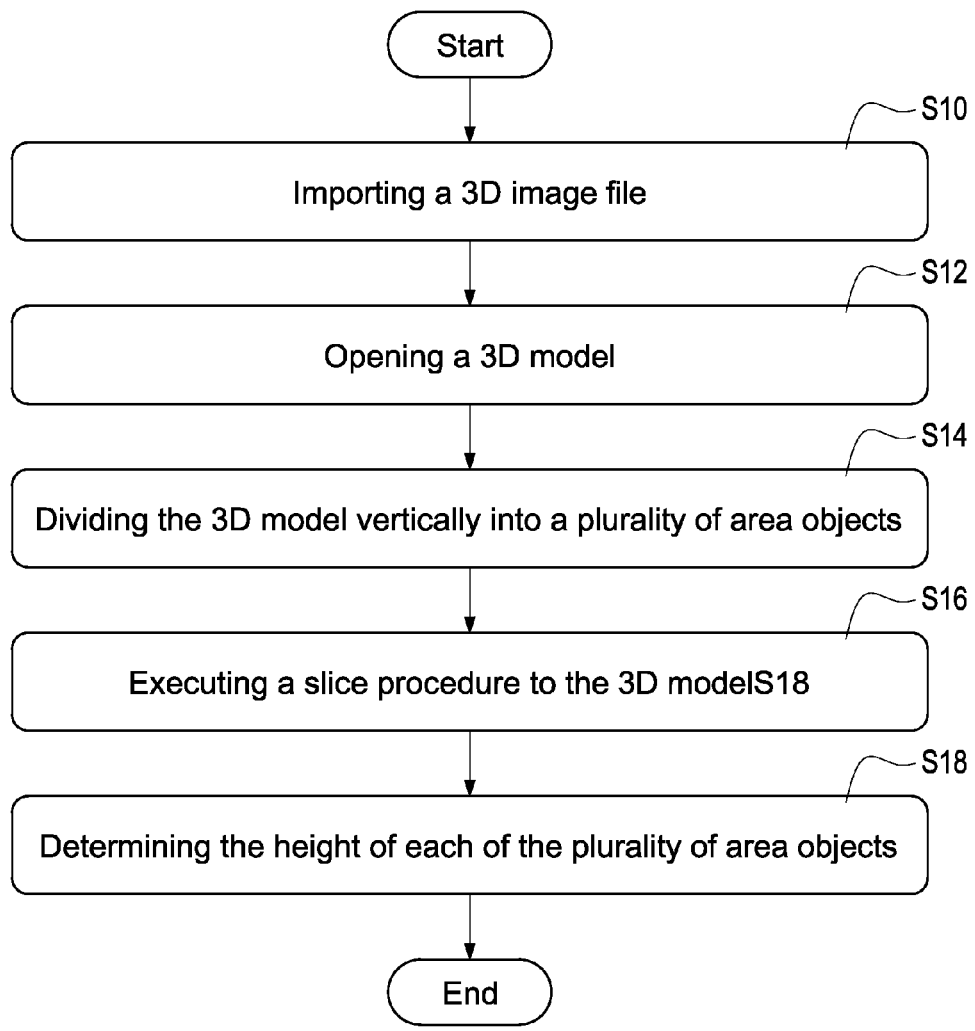
FIG. 2 is a flowchart of producing 3D model of a first embodiment according to the present disclosure.
Figure 3:
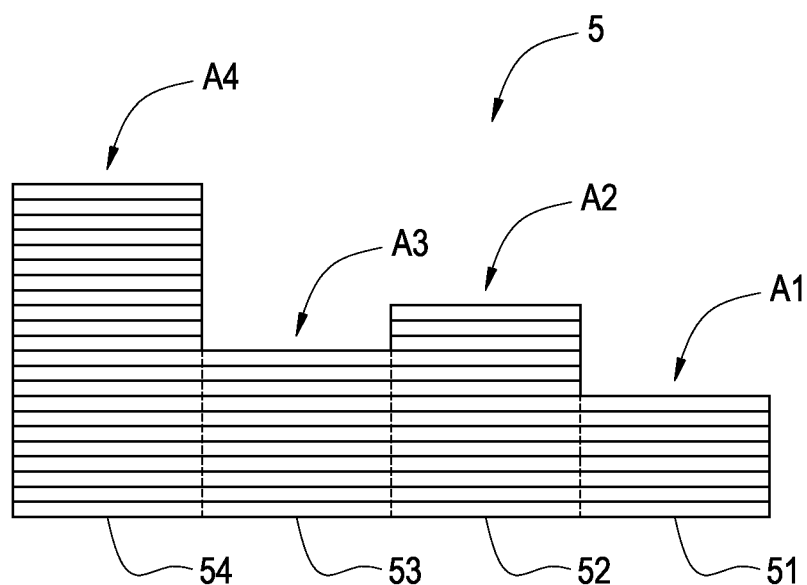
FIG. 3 is a schematic diagram of 3D model of the first embodiment according to the present disclosure.

FIG. 2 is a flowchart of producing 3D model of a first embodiment according to the present disclosure. FIG. 3 is a schematic diagram of 3D model of the first embodiment according to the present disclosure. To produce a real 3D model by applying the printing method disclosed in this invention, firstly, a 3D image file needs to be imported to the 3D printer 1 (step S10). Therefore, the 3D printer 1 opens a 3D model 5 included in the 3D image file (step S12). In this embodiment, a user can import the 3D image file to the 3D printer 1 through wired communication interfaces (such as a USB drive, a transmission cable, etc.) or wireless communication interfaces (such as LAN, Bluetooth, etc.), and the 3D printer 1 opens the 3D image file and generates the 3D model through an internal micro controller (not shown), but not limited thereto.

After opening the 3D model 5, the 3D printer 1 divides the 3D model 5 vertically into several area objects (step S14). In particularly, the 3D printer 1 divides the 3D model 5 into a plurality of area objects (such as area objects 51-54 shown in FIG. 3) based on the size of the nozzle array 2 of the 3D printer 1. More specifically, the widths of the plurality of area objects 51-54 are equal to each other, and also equal to the width of the nozzle array 2. Furthermore, each of the plurality of area objects 51-54 is respectively corresponding to an area of the 3D model 5 being formed and produced on the forming platform 3 of the 3D printer 1.

As shown in FIG. 3, in this embodiment, the 3D printer 1 divides the 3D model 5 vertically into a first area object 51 (corresponding to a first area A1), a second area object 52 (corresponding to a second area A2), a third area object 53 (corresponding to a third area A3), and a fourth area object 54 (corresponding to a fourth area A4). However, the above description is just a specific embodiment, not limited thereto.

The embodiment of the present invention divides the 3D model 5 into the plurality of area objects 51-54, and a jetting range of the nozzle array 2 can cover a whole area object of the plurality of area objects 51-54. When the nozzle array 2 is moved and located upon a specific area, and is controlled to jet ink at the specific area for stacking an area object corresponding to the specific area, the nozzle array 2 is fixed thereto and cannot be moved. As a result, the embodiment of the present invention can greatly reduce the moving frequency of the nozzle array 2 when stacking the 3D model 5.

Besides, the 3D printer 1 executes a slice procedure to the 3D model 5 after opening the 3D model 5 (step S16). The slice procedure can be, for example, a stereolithography (SLA) slice procedure, but not limited thereto. After the step S16, the 3D printer 1 can determine the height of each of the plurality of area objects 51-54 respectively according to the number of the layers of each of the plurality of area objects 51-54 (step S18).

Figure 4:
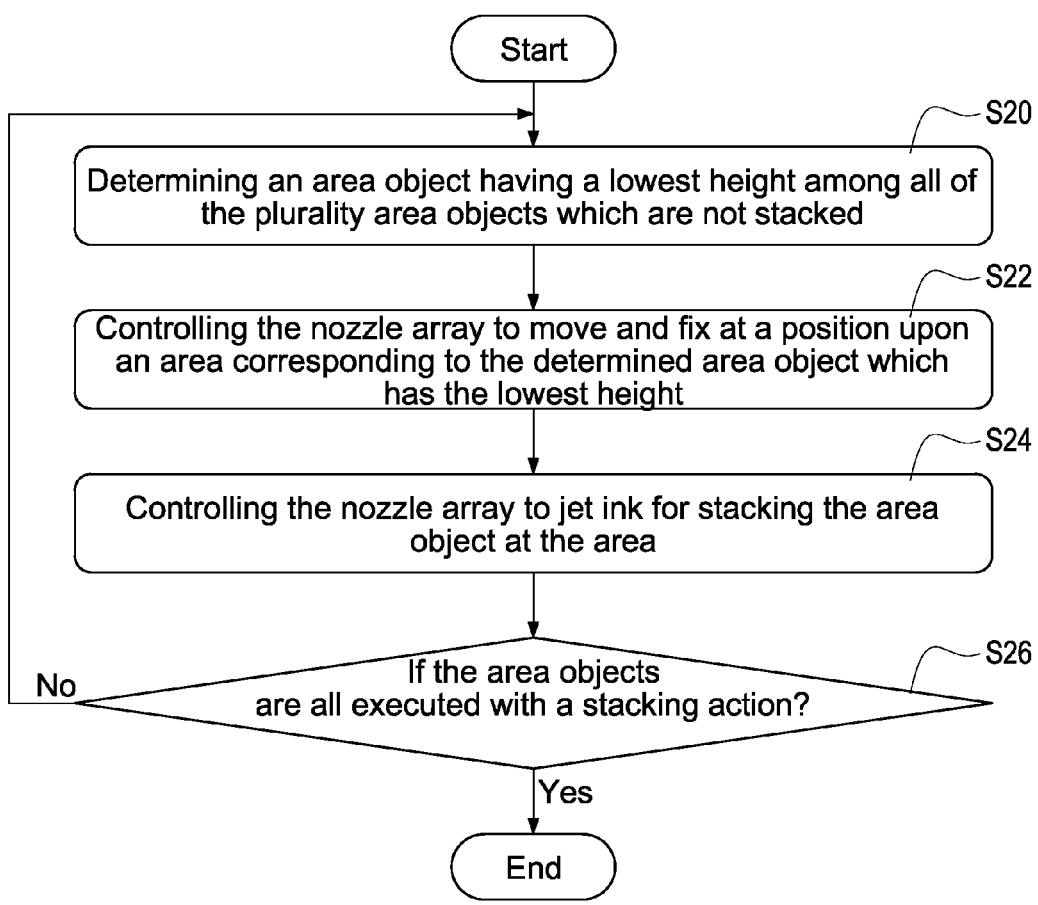
FIG. 4 is a printing flowchart of the first embodiment according to the present disclosure.

FIG. 4 is a printing flowchart of the first embodiment according to the present disclosure. When starting a printing procedure, the 3D printer 1 firstly determines an area object having a lowest height among all of the plurality area objects 51-54 which are not stacked (step S20), i.e., the area object has the least number of layers. Secondly, the 3D printer 1 controls the nozzle array 2 to move and fix at a position upon an area corresponding to the determined area object which has the lowest height (step S22), and the nozzle array 2 is then controlled to jet ink for stacking the area object at the area (step S24).

In the step S24, the nozzle array 2 is fixed upon the area until the area object corresponding to the area is finished stacking, or is stacked to a threshold height (detailed described below). It is to say, when stacking the area object, the nozzle array 2 needs not to move, so the moving frequency of the nozzle array 2 during the printing procedure is greatly reduced. In this embodiment, if the 3D model 5 is divided into four parts (for example, the four area objects 51-54 in this embodiment), the nozzle array 2 only needs to move four times in a best solution and the 3D model 5 can be stacked and produced completely. Therefore, the producing time of the 3D model 5 can be greatly reduced.

After the step S24, the current area object which has the lowest height is finished stacking. Then, the 3D printer 1 determines if the plurality of area objects 51-54 are all executed with a stacking action (step S26). If not, it means that the plurality of area objects 51-54 are not yet finished stacking, so the 3D printer 1 goes back to the step S20, controls the nozzle array 2 to move to the next area and starts stacking the next area object at the next area. If all of the plurality of area objects 51-54 are finished stacking, the 3D printer 1 constitutes the 3D model 5 by the plurality of area objects 51-54, and terminates the current printing procedure.

It should be mentioned that the 3D printer 1 in this embodiment first controls the nozzle array 2 to stack one area object which has the lowest height, and then stack other area object which has second lowest height, and so on, and finally stack the area object which has the highest height. Therefore, the 3D printer 1 can solve the problem that the nozzle array 2 is interfered with the completely stacked area object(s) while moving and jetting. However, the jetting order of the nozzle array 2 is varied based on user demands, not limited to the embodiments disclosed in the present specification.

Refers to FIG. 5A to FIG. 5H, are schematic diagrams of a first printing movement to an eighth printing movement of the first embodiment according to the present disclosure.

Figure 5A:
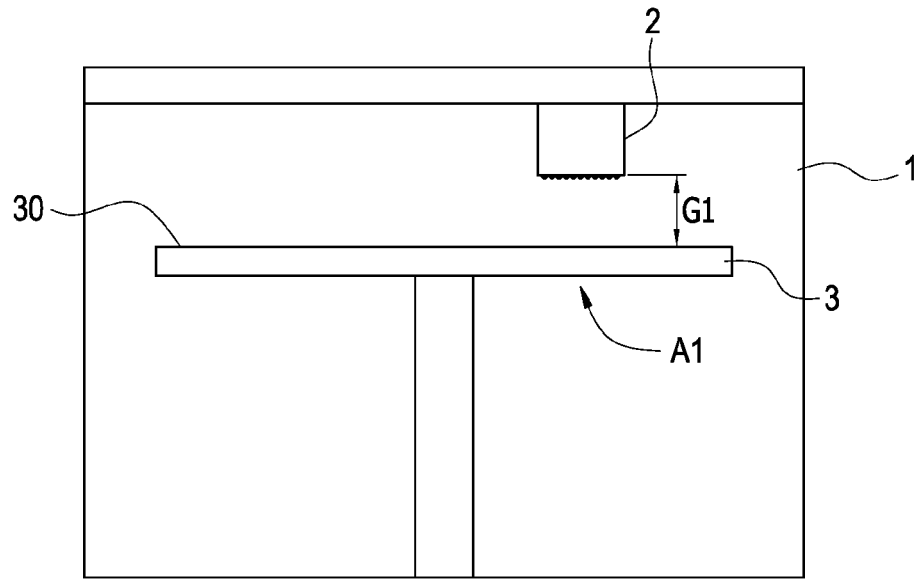
FIG. 5A is a schematic diagram of a first printing movement of the first embodiment according to the present disclosure.

Refers to FIG. 5A at first, before starting printing the 3D model 5, the 3D printer 1 controls the forming platform 3 to rise, and keeps a fixed gap G1 between the nozzle array 2 and the forming platform 3. In particularly, there has the gap G1 existed and kept between a top face 30 of the forming platform 3 and the nozzle array 2. Besides, the 3D printer 1 determines the area object having the lowest height is the first area object 51 in the step S20, and controls the nozzle array 2 to move and fix at the position upon the first area A1 corresponding to the first area object 51 (as shown in FIG. 3)

Figure 5B:
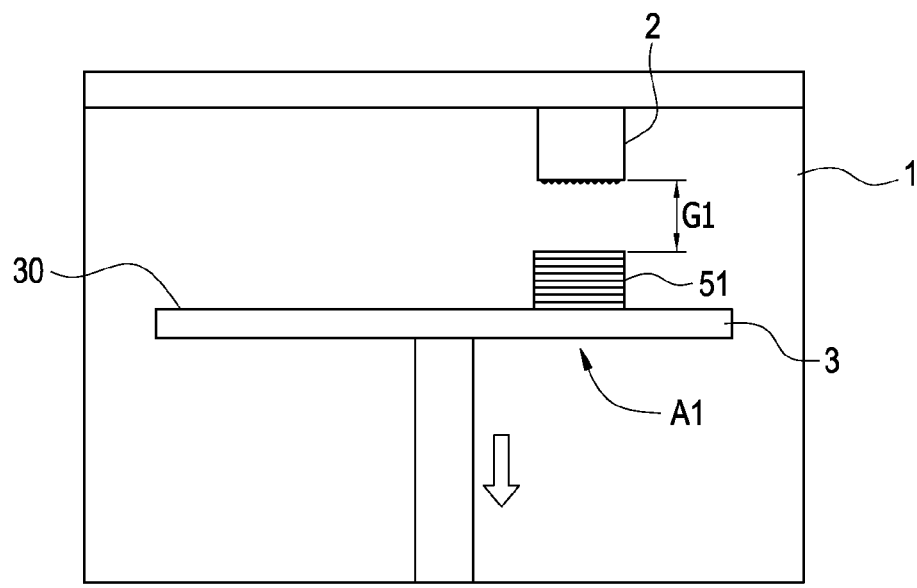
FIG. 5B is a schematic diagram of a second printing movement of the first embodiment according to the present disclosure.
Figure 5C:
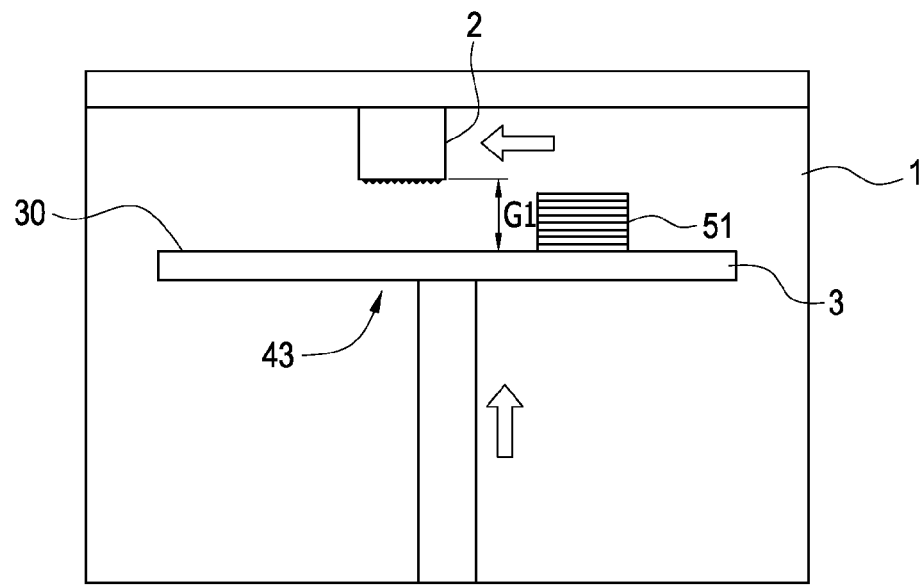
FIG. 5C is a schematic diagram of a third printing movement of the first embodiment according to the present disclosure.

As shown in FIG. 5B, the nozzle array 2 is then controlled to jet ink at the top face 30 of the forming platform 3 for stacking the first area object 51 upon the first area A1. As the first area object 51 is stacked gradually, the forming platform 3 is controlled to descend slowly, so as to keep the gap G1 exists between a top face of the first area object 51 (replacing the top face 30 of the forming platform 3) and the nozzle array 2. As shown in FIG. 5C, after the first area object 51 is finished stacking, the 3D printer 1 determines again the current area object having the lowest height among all of the remaining un-stacked area objects (in this embodiment, the remaining un-stacked area objects comprises the second area object 52, the third area object 53, and the fourth area object 54, wherein the third area object 53 has the lowest height among all of the remaining un-stacked area objects).

Figure 5D:
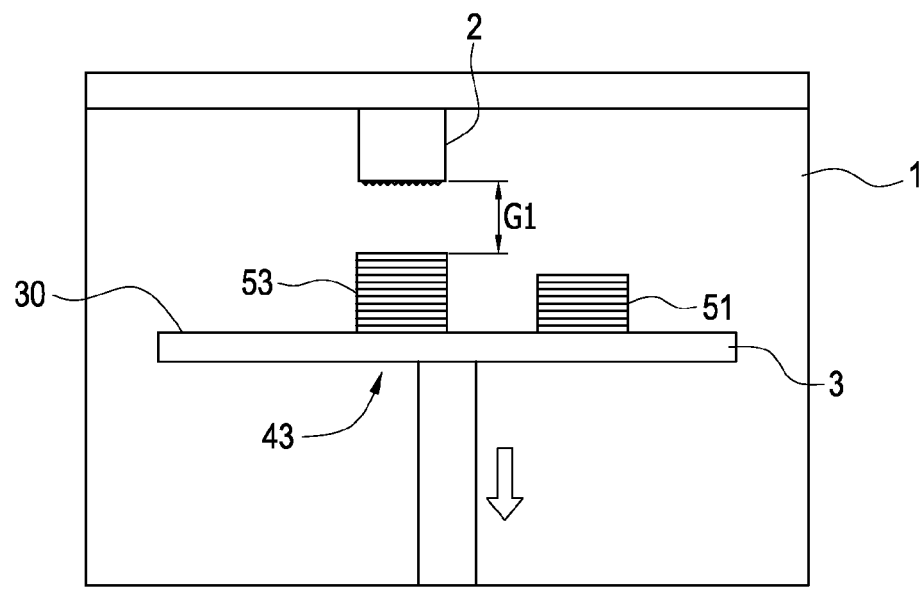
FIG. 5D is a schematic diagram of a fourth printing movement of the first embodiment according to the present disclosure.

After the determination, the 3D printer 1 controls the nozzle array 2 to move and fix at the position upon the third area A3 corresponding to the third area object 53. In the meantime, the 3D printer 1 controls the forming platform 3 to rise, so as to keep the gap G1 exists between the top face 30 of the forming platform 3 and the nozzle array 2. Then, as shown in FIG. 5D, the nozzle array 2 is controlled to jet ink for stacking the third area object 53 at the third area A3. As described above, as the ink jetted at the forming platform 3 solidifies gradually, a forming-surface is changed from the top face 30 of the forming platform 3 to a surface of the third area object 53, and the 3D printer 1 controls the forming platform 3 to descend slowly, so as to keep the gap G1 exists between the forming-surface and the nozzle array 2.

Figure 5E:
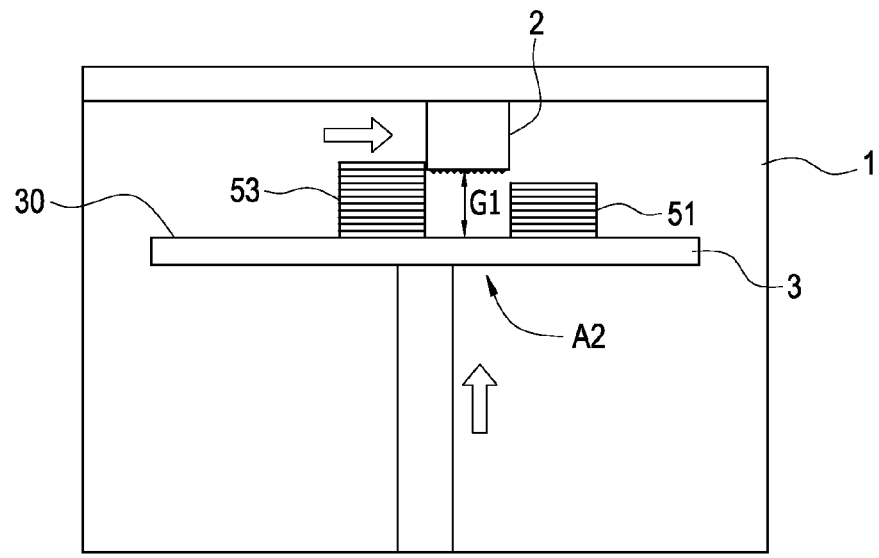
FIG. 5E is a schematic diagram of a fifth printing movement of the first embodiment according to the present disclosure.

As shown in FIG. 5E, after the third area object 53 is finished stacking, the 3D printer 1 determines again the current area object having the lowest height among all remaining un-stacked area objects (now the remaining un-stacked area objects only comprises the second area object 52 and the fourth area object 54, wherein the area object having the lowest height is the second area object 52). After the determination, the 3D printer 1 controls the nozzle array 2 to move and fix at the position upon the second area A2 corresponding to the second area object 52. In the meantime, the 3D printer 1 controls the forming platform 3 to rise, so as to keep the gap G1 exists between the top face 30 of the forming platform 3 and the nozzle array 2.

Figure 5F:
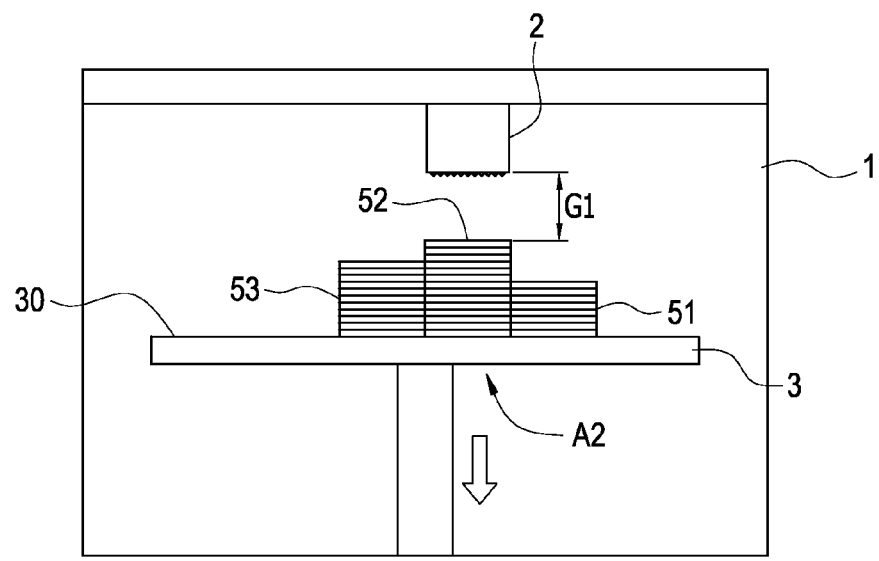
FIG. 5F is a schematic diagram of a sixth printing movement of the first embodiment according to the present disclosure.
Figure 5G:
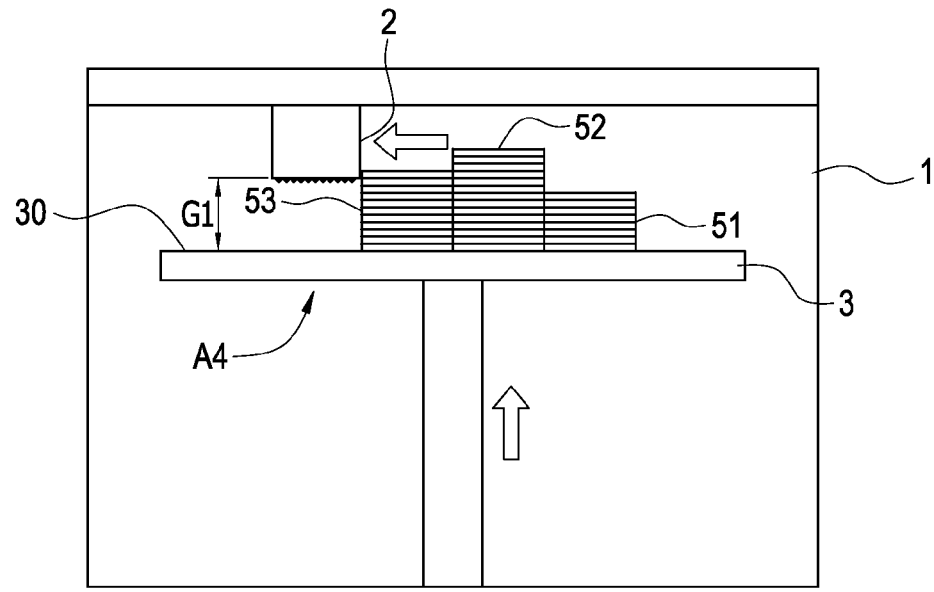
FIG. 5G is a schematic diagram of a seventh printing movement of the first embodiment according to the present disclosure.
Figure 5H:
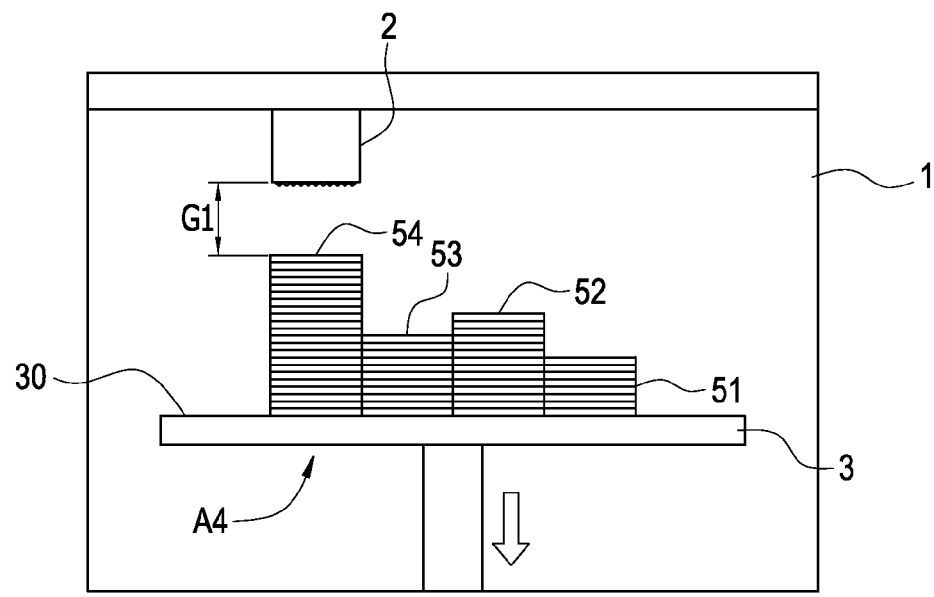
FIG. 5H is a schematic diagram of an eighth printing movement of the first embodiment according to the present disclosure.

As shown in FIG. 5F, the 3D printer 1 then controls the nozzle array 2 to jet ink for stacking the second area object 52 at the second area A2. Refers to FIG. 5G, after the second area object 52 is finished stacking, the 3D printer 1 determines again the current area object having the lowest height among all remaining un-stacked area objects (at this time, only the fourth area object 54 is un-stacked and remaining). After the determination, the 3D printer 1 controls the nozzle array 2 to move and fix at the position upon the fourth area A4 corresponding to the fourth area object 54. In the meantime, the 3D printer 1 also controls the forming platform 3 to rise and keep the gap G1 exists between the top face 30 of the forming platform 3 and the nozzle array 2. Finally, as shown in FIG. 5H, the 3D printer 1 then controls the nozzle array 2 to jet ink for stacking the fourth area object 54 at the fourth area A4.

After the fourth area object 54 is finished stacking, the 3D printer 1 can determine that all of the plurality of area objects 51-54 are stacked completely, and then determines the 3D model 5 is produced completely. Therefore, the 3D printer 1 can terminate this printing procedure.

As mentioned above, for preventing the nozzle array 2 from ink splattering situation during jetting ink, the 3D printer 1 needs to control the forming platform 3 to rise or to descend, and keeps the gap G1 exists between the nozzle array 2 and the forming-surface (i.e., the top face 30 of the forming platform 3 or the surface of the stacking area object) continually. However, when executing the printing procedures, if the height of a pre-stacked area object is higher than that of the gap G1, the pre-stacked area object area object may collide with the nozzle array 2 or a top face of an internal of the 3D printer 1 when the forming platform 3 is controlled to rise. Therefore, a distance between the nozzle array 2 and the forming platform 3 cannot be kept as the gap G1, and the 3D printer 1 cannot move on to execute following stacking actions for stacking the next area objects.

According to above mentioned problem, further embodiments of the present invention are also disclosed, which is described as the following.

Figure 6:
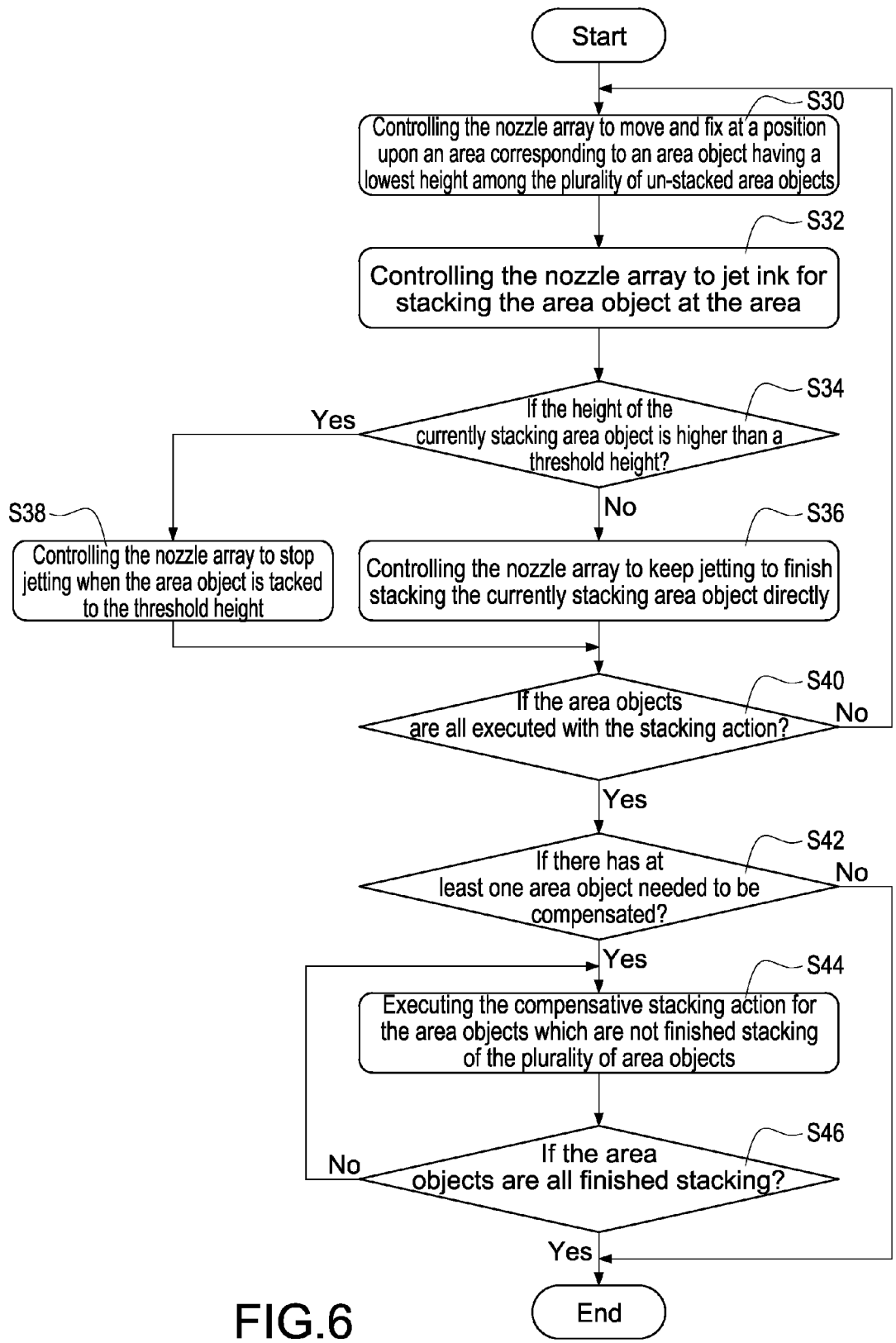
FIG. 6 is a printing flowchart of a second embodiment according to the present disclosure.

FIG. 6 is a printing flowchart of a second embodiment according to the present disclosure. As the step S20 to the step S24 described above in FIG. 4, the 3D printer 1 firstly controls the nozzle array 2 to move and fix at a position upon an area which is corresponding to an area object having a lowest height among all of the plurality of un-stacked area objects 51-54 (step S30), and then controls the nozzle array 2 to jet ink for stacking the area object at the area (step S32).

In this embodiment, the 3D printer 1 determines if the height of the currently stacking area object is higher than a threshold height (step S34). If the height of the currently stacking area object is not higher than the threshold height, the 3D printer 1 controls the nozzle array 2 to keep jetting, so as to finish stacking the currently stacking area object directly.

On the other hand, if determining the height of the currently stacking area object is higher than the threshold height, the 3D printer 1 still controls the nozzle array 2 to jet ink for stacking the currently stacking area object, but controls the nozzle array 2 to stop jetting when the area object is tacked to the threshold height (step S38). In particularly, if the height of the currently stacking area object is higher than that of the gap G1 needed to be kept between the nozzle array 2 and the forming-surface, the currently stacking area object may interfere with following stacking actions for stacking the remaining un-stacked area objects. As such, this embodiment stacks the currently stacking area object to the threshold height at first, and then executes a compensative stacking action for compensating and stacking the area object to its original height.

In this embodiment, the threshold height is corresponding to the distance (i.e., the gap G1) needed to be kept between the nozzle array 2 and the forming platform 3. It should be mentioned that in other embodiment, the 3D printer 1 can have a tolerance of ink splattering. In particularly, the distance between the nozzle array 2 and the forming platform 3 can be a little higher than the gap G1 in other embodiment, although the ink splattering situation may occur when the nozzle array 2 is controlled to jet ink, but the level of the ink splattering situation is acceptable and will not affect the producing of the 3D model 5. As a result, in other embodiment, the threshold height can be set as a sum of the gap G1 between the nozzle array 2 and the forming platform 3 plus the tolerance of ink splattering. However, the above description is just a preferred embodiment, not intended to limit the scope of the present invention.

After the step S36 and the step S38, the 3D printer 1 determines if the plurality of area objects are all executed with the stacking action (step S40). In particularly, the step S40 is to determine whether all of the area objects are finished stacking or not (i.e., no further compensative stacking action is needed), or whether all of the area objects are stacked to the threshold height (i.e., at least one compensative stacking action is needed).

If at least one area object of the plurality of area objects is not stacked (i.e., the 3D printer 1 does not execute the stacking action for this area object, and there is no physical object being formed upon the area corresponding to this area object yet), the 3D printer 1 goes back to the step S30, and re-executes the step S30 to the step S40.

If all of the plurality of area objects are already stacked (i.e., the 3D printer 1 does execute the stacking actions for all of the plurality of are objects), the 3D printer 1 further determines if there is at least one area object needed to be compensated or not (i.e., the 3D printer 1 needs to execute the compensative stacking action for that area object) (step S42). If the 3D printer 1 determines there is no area object needing the compensative stacking action, the plurality of area objects are determined to be stacked completely (i.e., the 3D model 5 is produced completely), and the 3D printer 1 terminates the printing procedure.

If determining in the step S42 that at least one area object needs to be compensated (i.e., the 3D printer 1 needs to execute the compensative stacking action thereto), the 3D printer 1 controls the nozzle array 2 to move and to jet ink, for executing the compensative stacking action for the area objects which are not finished stacking of the plurality of area objects (step S44).

It should be mentioned that the step S44 is similar to the above stacking action, where the 3D printer 1 controls the nozzle array 2 to move to a position upon an area corresponding to an area object which needs to be compensated, and the nozzle array 2 is fixed upon the area to start jetting ink, so as to compensate and stack the area object to an original height. Then, the 3D printer 1 determines if the plurality of area objects 51-54 are all finished stacking (step S46). If the plurality of area objects 51-54 are not finished stacking (i.e., parts of the plurality of area objects 51-54 are not being compensated yet), the 3D printer 1 goes back to the step S44, and controls the nozzle array 2 to move to next area and compensate and stack the next area object, until all of the plurality of area objects 51-54 are totally stacked completely.

In above first embodiment and second embodiment, the 3D printer 1 uses an onetime stack way, which directly stacks the whole area object at a time and stacks multiple area objects one-by-one, and only stack the area object by segments when the height of the area object is higher than the threshold height, so as to complete the stacking action for stacking the area object by segments. However, in other embodiments, the 3D printer 1 can directly use a segment stack way, which stacks the area objects by segments for producing the 3D model 5. The detailed description is described as follow.

Figure 7:
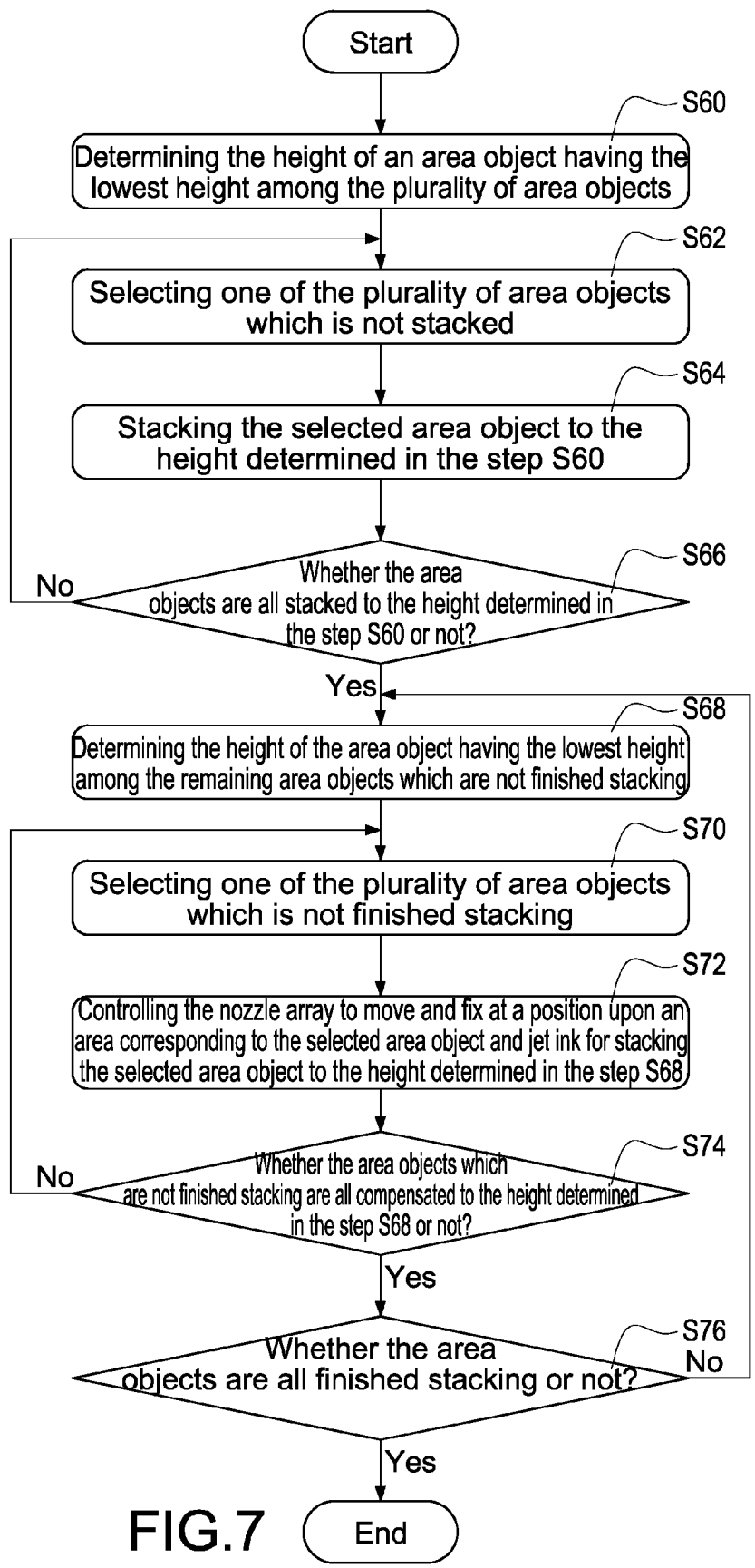
FIG. 7 is a printing flowchart of a third embodiment according to the present disclosure.

FIG. 7 is a printing flowchart of a third embodiment according to the present disclosure. In this embodiment, the 3D printer 1 determines the height of an area object having the lowest height among the plurality of area objects 51-54 before starting the printing procedure (step S60). In this embodiment, the area object having the lowest height is exemplary as the first area object 51. After the step S60, the 3D printer 1 selects one of the plurality of area objects 51-54 which is not stacked yet (step S62), and controls the nozzle array 2 to move and fix at a position upon an area corresponding to the selected area object to jet ink for stacking the selected area object to the height determined in the step S60 (step S64), i.e., the height of the first area object 51. After the step S64, the 3D printer 1 determines whether the plurality of area objects 51-54 are stacked to the height determined in the step S60 or not (step S66). If not, the 3D printer 1 goes back to the step S62, and re-executes the step S62 and the step S64.

After the plurality of area objects 51-54 are all stacked to the height determined in the step S60, the 3D printer 1 controls the nozzle array 2 to execute the compensative stacking action for the area object(s) which are not finished stacking of the plurality of area objects 51-54.

In particularly, the 3D printer 1 first determines the height of the area object having the lowest height among the remaining area objects which are not finished stacking (step S68), then, selects one of the plurality of area objects which is not finished stacking (step S70). In the meantime, the 3D printer 1 controls the nozzle array 2 to move and fix at a position upon an area corresponding to the selected area object and jet ink for stacking the selected area object to the height determined in the step S68 (step S72).

After the step S72, the 3D printer 1 determines whether the plurality of area objects which are not finished stacking are compensated to the height determined in the step S68 or not (step S74). If not, the 3D printer 1 re-execute the step S70 to the step S72, until all of the area objects which are not finished stacking are compensated to the height determined in the step S68.

If yes in the step S74, the 3D printer 1 further determines whether the plurality of area objects 51-54 are finished stacking or not (step S76). If not, the 3D printer 1 goes back to the step S68, and determines again the height needed to be compensated and stacked this time, and re-executes the step S70 to the step S74 again, until the plurality of area objects 51-54 are all finished stacking, and no more compensative stacking action is needed. When the plurality of area objects 51-54 are all stacked completely, the 3D printer 1 terminates the printing procedure.

Refers to FIG. 8A to FIG. 8H, are schematic diagrams of a first printing movement to an eighth printing movement of the third embodiment according to the present disclosure.

As shown in FIG. 8A to FIG. 8E, in this embodiment, after the determination, the 3D printer 1 determines the area object having the lowest height among the plurality of area objects 51-54 is the first area object 51. Therefore, it firstly controls the nozzle array 2 to move to a position upon the fourth area A4 for stacking a semi-finished fourth area object 541 at the fourth area A4, then, controls the nozzle array 2 to move to a position upon the third area A3 for stacking a semi-finished third area object 531 at the third area A3, and then controls the nozzle array 2 to move to a position upon the second area A2 for stacking a semi-finished second area object 521 at the second area A2, and finally, controls the nozzle array 2 to move to a position upon the first area A1 for completely stacking the first area object 511 at the first area A1. In this embodiment, the semi-finished second area object 521, the semi-finished third area object 531 and the semi-finished fourth area object 541 have the height as the same as the first area object 51 which has been finished stacking.

After the first area object 51, the semi-finished second area object 521, the semi-finished third area object 531 and the semi-finished fourth area object 541 are finished stacking, the 3D printer 1 next determines the area object having the lowest height among the remaining unfinished area objects (at the time, only the second area object 52, the third area object 53 and the fourth area object 54 are not finished stacking, wherein the third area object 53 has the lowest height currently).

Figure 8A:
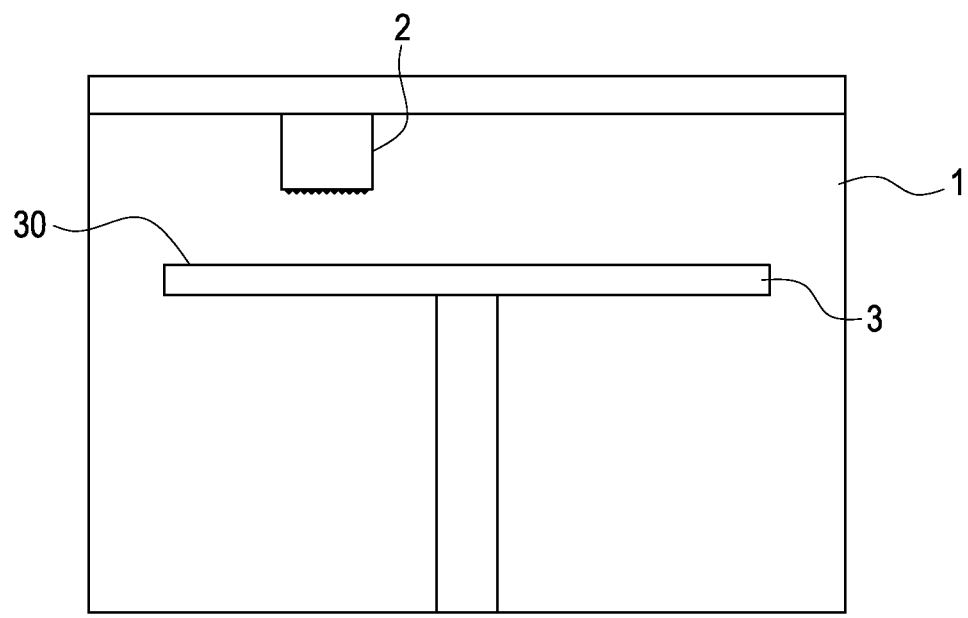
FIG. 8A is a schematic diagram of a first printing movement of the third embodiment according to the present disclosure.
Figure 8B:
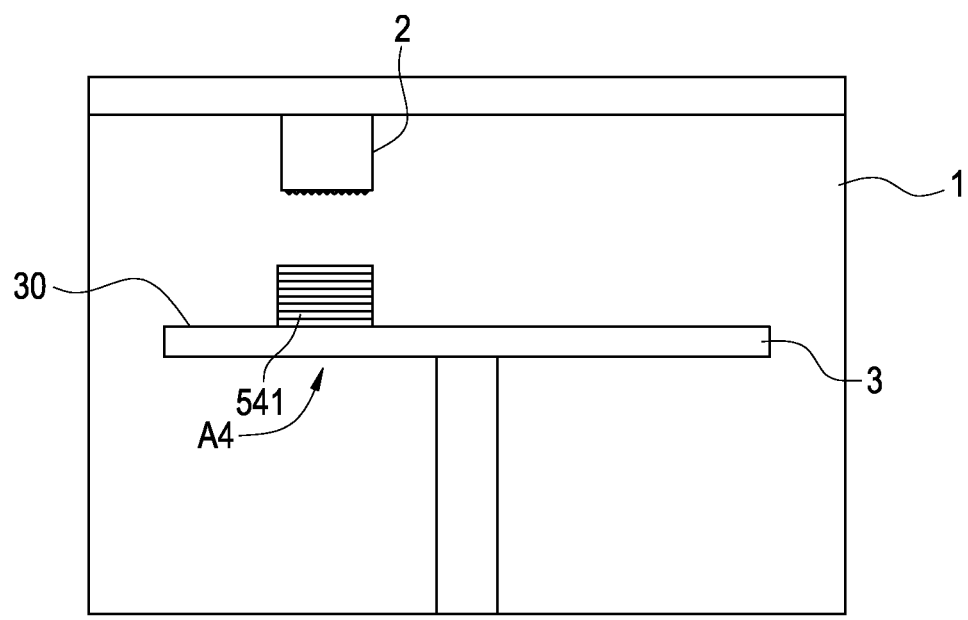
FIG. 8B is a schematic diagram of a second printing movement of the third embodiment according to the present disclosure.
Figure 8C:
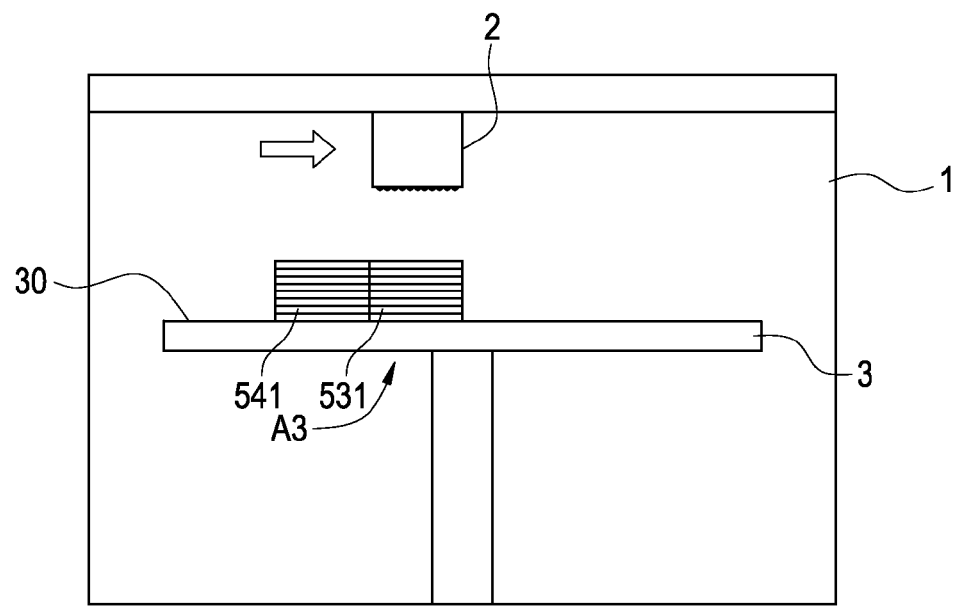
FIG. 8C is a schematic diagram of a third printing movement of the third embodiment according to the present disclosure.
Figure 8D:
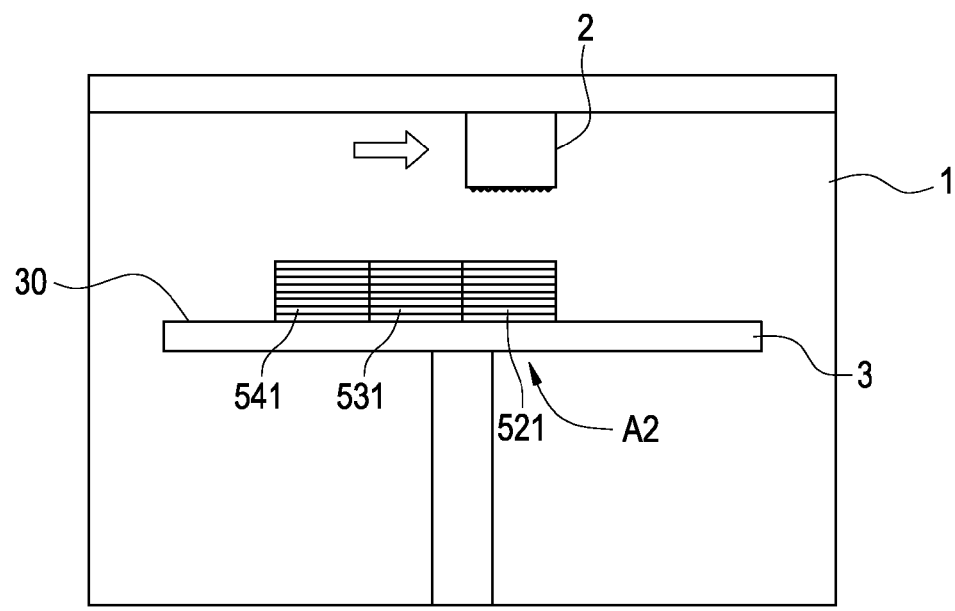
FIG. 8D is a schematic diagram of a fourth printing movement of the third embodiment according to the present disclosure.
Figure 8E:
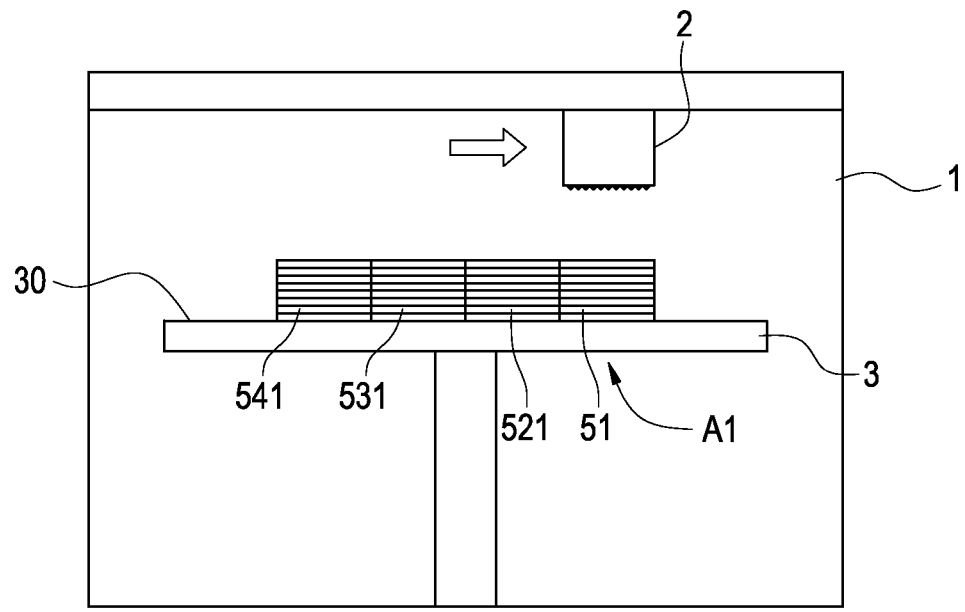
FIG. 8E is a schematic diagram of a fifth printing movement of the third embodiment according to the present disclosure.
Figure 8F:
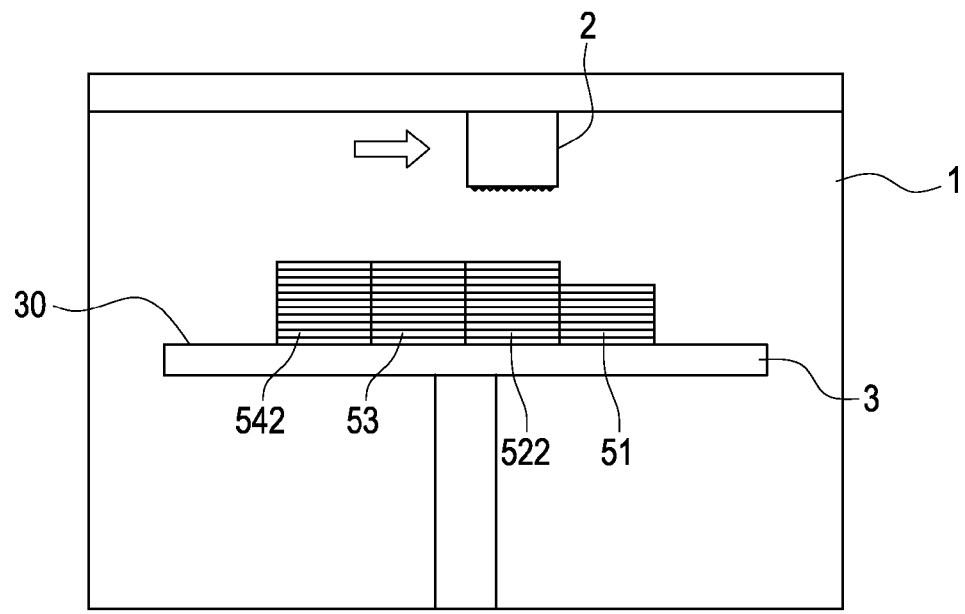
FIG. 8F is a schematic diagram of a sixth printing movement of the third embodiment according to the present disclosure.

As shown in FIG. 8F, the 3D printer 1 controls the nozzle array 2 to move to the fourth area A4, the third area A3, and the second area A2 in order, and controls the nozzle array 2 to execute the compensative stacking actions for the semi-finished fourth area object 541, the semi-finished third area object 531, and the semi-finished second area object 521 in order, so as to stack and produce a semi-finished fourth area object 542, the third area object 53 and a semi-finished second area object 522. At the time, both the semi-finished fourth area object 542 and the semi-finished second area object 522 have the height as the same as the third area object 53 which has been finished stacking.

Figure 8G:
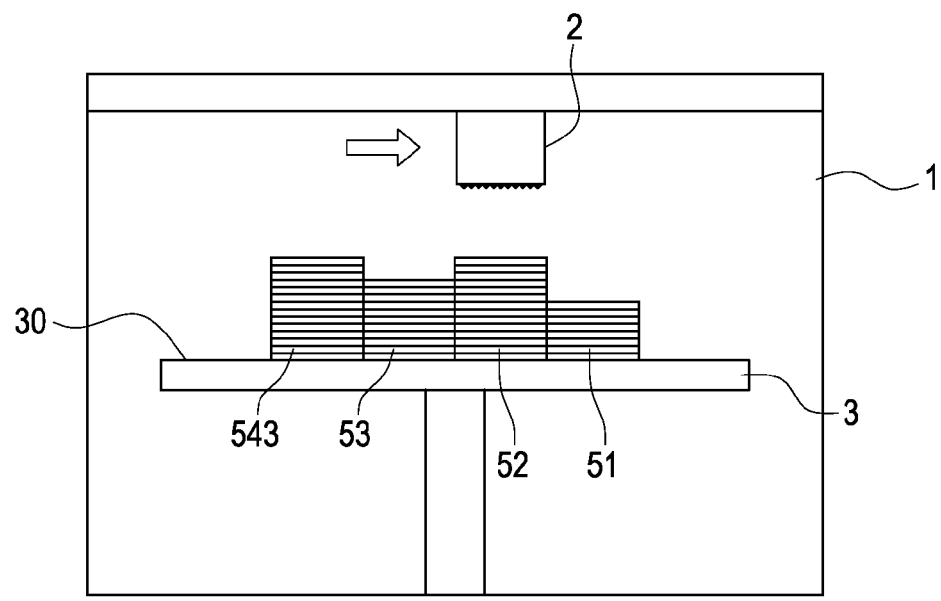
FIG. 8G is a schematic diagram of a seventh printing movement of the third embodiment according to the present disclosure.
Figure 8H:
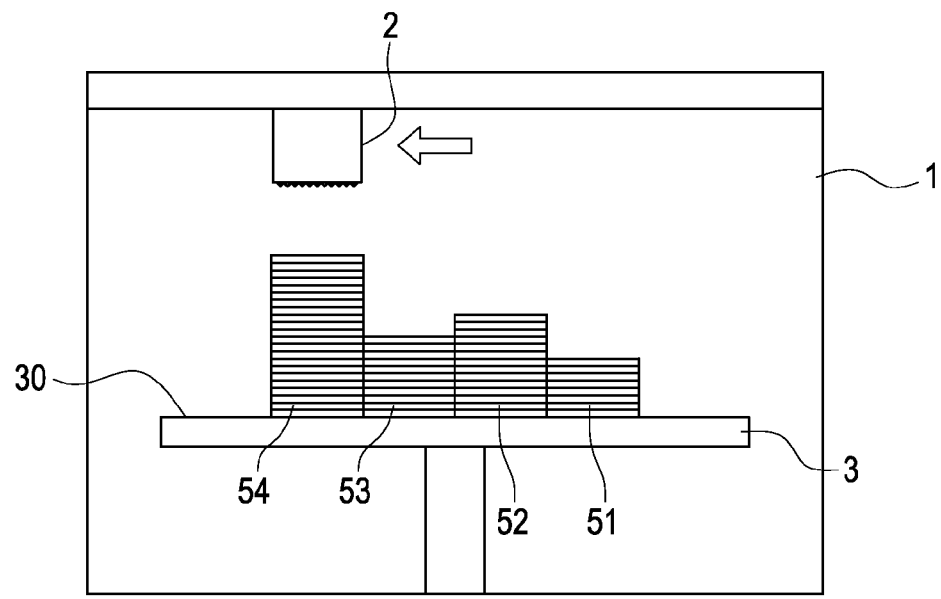
FIG. 8H is a schematic diagram of an eighth printing movement of the third embodiment according to the present disclosure.

As shown in FIG. 8G, the 3D printer 1 then determines again the area object having the lowest height among the remaining unfinished area objects (at the time, only the second area object 52 and the fourth area object 54 are not finished stacking, wherein the second area object 52 has the lowest height currently), then it controls the nozzle array 2 to move to the fourth area A4 and the second area A2 in order, and controls the nozzle array 2 to execute the compensative stacking actions for the semi-finished fourth area object 542 and the semi-finished second area object 522 in order, so as to stack and produce a semi-finished fourth area object 543 and the second area object 52, wherein the semi-finished fourth area object 543 has the height as the same as the second area object 52 which has been finished stacking.

Finally, the 3D printer 1 controls the nozzle array 2 to move to the fourth area A4, and to execute the compensative stacking action for the semi-finished fourth area object 543, so as to finish stacking the fourth area object 54. At the time, the plurality of area objects 51-54 are all stacked completely, i.e., the 3D model 5 is produced completely. Therefore, the 3D printer 1 can terminate the printing procedure.

By way of the printing method disclosed in the present invention, the time spent for printing and the moving frequency needed for the nozzle array 2 during the printing procedures can be reduced greatly, no matter the onetime stack way or the segments stack way is applied by the 3D printer 1.

As the skilled person will appreciate, various changes and modifications can be made to the described embodiment. It is intended to include all such variations, modifications and equivalents which fall within the scope of the present invention, as defined in the accompanying claims.

What is claimed is:

1. A printing method for a 3D printer, the 3D printer at least having a nozzle array and a forming platform, and the printing method comprising:
   a) dividing a 3D model vertically into a plurality of area objects, wherein each of the plurality of area objects is corresponded to an area of the forming platform and has multiple layers;
   b) determining a specific area object having a lowest height among the plurality of area objects which are not stacked;
   c) controlling the nozzle array to move and fix at a position upon the area corresponding to the specific area object;
   d) after the step c, controlling the nozzle array to jet ink for completely stacking all layers of the specific area object at the area; and
   e) re-executing the step b to the step d before the plurality of area objects are stacked by executing a stacking action,
   wherein a width of each of the plurality of area objects is equal to a width of the nozzle array.

2. The printing method of claim 1, wherein the step d comprises following steps of:
   d1) determining whether a height of the specific area object is higher than a threshold height;
   d2) if the height of the specific area object is not higher than the threshold height, controlling the nozzle array to keep jetting for completing the stacking action for the specific area object; and
   d3) if the height of the specific area object is higher than the threshold height, controlling the nozzle array to stop jetting when the specific area object is stacked to the threshold height.

3. The printing method of claim 2, wherein further comprises a step f: after the step e, executing a compensative stacking action for area objects which are not finished stacking of the plurality of area objects.

4. The printing method of claim 3, wherein the step f comprises following steps of:
   f1) controlling the nozzle array to move and fix at a position upon an area corresponding to the area object which needs to be executed with the compensative stacking action;
   f2) after the step f1, controlling the nozzle array to jet ink for executing the compensative stacking action for the area object in the step f1; and
   f3) re-executing the step f1 to the step f2 before the plurality of area objects which are not finished stacking are executed with the compensative stacking action.

5. The printing method of claim 3, wherein the threshold height is corresponding to a distance between the nozzle array and the forming platform.

6. A printing method for a 3D printer, the 3D printer at least having a nozzle array and a forming platform, and the printing method comprising:
   a) dividing a 3D model vertically into a plurality of area objects, wherein each of the plurality of area objects is corresponded to an area of the forming platform;
   b) determining a specific area object having a lowest height among the plurality of area objects which are not stacked;
   c) controlling the nozzle array to move and fix at a position upon the area corresponding to the specific area object;
   d) after the step c, controlling the nozzle array to jet ink for stacking the specific area object at the area, which includes the following steps of:
      d1) determining whether a height of the specific area object is higher than a threshold height;
      d2) if the height of the specific area object is not higher than the threshold height, controlling the nozzle array to keep jetting for completing the stacking action for the specific area object;
      d3) if the height of the specific area object is higher than the threshold height, controlling the nozzle array to stop jetting when the specific area object is stacked to the threshold height; and
   e) re-executing the step b to the step d before the plurality of area objects are stacked by executing a stacking action, wherein the threshold height is corresponding to a sum of a distance between the nozzle array and the forming platform plus a tolerance of ink splattering.

7. A printing method for a 3D printer, the 3D printer at least having a nozzle array and a forming platform, and the printing method comprising:
   a) dividing a 3D model vertically into a plurality of area objects, wherein each of the plurality of area objects is corresponded to an area of the forming platform and has multiple layers;
   b) determining a height of a specific area object having a lowest height among the plurality of area objects;
   c) selecting one of the plurality of area objects;
   d) after the step c, controlling the nozzle array to move and fix at a position upon an area corresponding to the selected area object and jet ink for completely printing multiple layers of the selected area object for stacking the selected area object to the height determined in the step b;
   e) re-executing the step c to the step d before the plurality of area objects are stacked to the height determined in the step b; and
   f) after the step e, executing a compensative stacking action for area objects which are not finished stacking of the plurality of area objects,
   wherein a width of each of the plurality of area objects is equal to a width of the nozzle array.

8. The printing method of claim 7, wherein the step f comprises following steps of:
   f1) determining a height of a specific area object having a lowest height among the plurality of area objects which are not finished stacking;
   f2) selecting one of the plurality of area objects which are not finished stacking;
   f3) after the step f2, controlling the nozzle array to move and fix at a position upon an area corresponding to the selected area object and jet ink for compensating and stacking the selected area object to the height determined in the step f1;
   f4) re-executing the step f2 to the step f3 before the plurality of area objects which are not finished stacking are compensated to the height determined in the step f1; and
   f5) re-executing the step f1 to the step f4 before the plurality of area objects are finished stacking.

* * * * *